Figure 1:
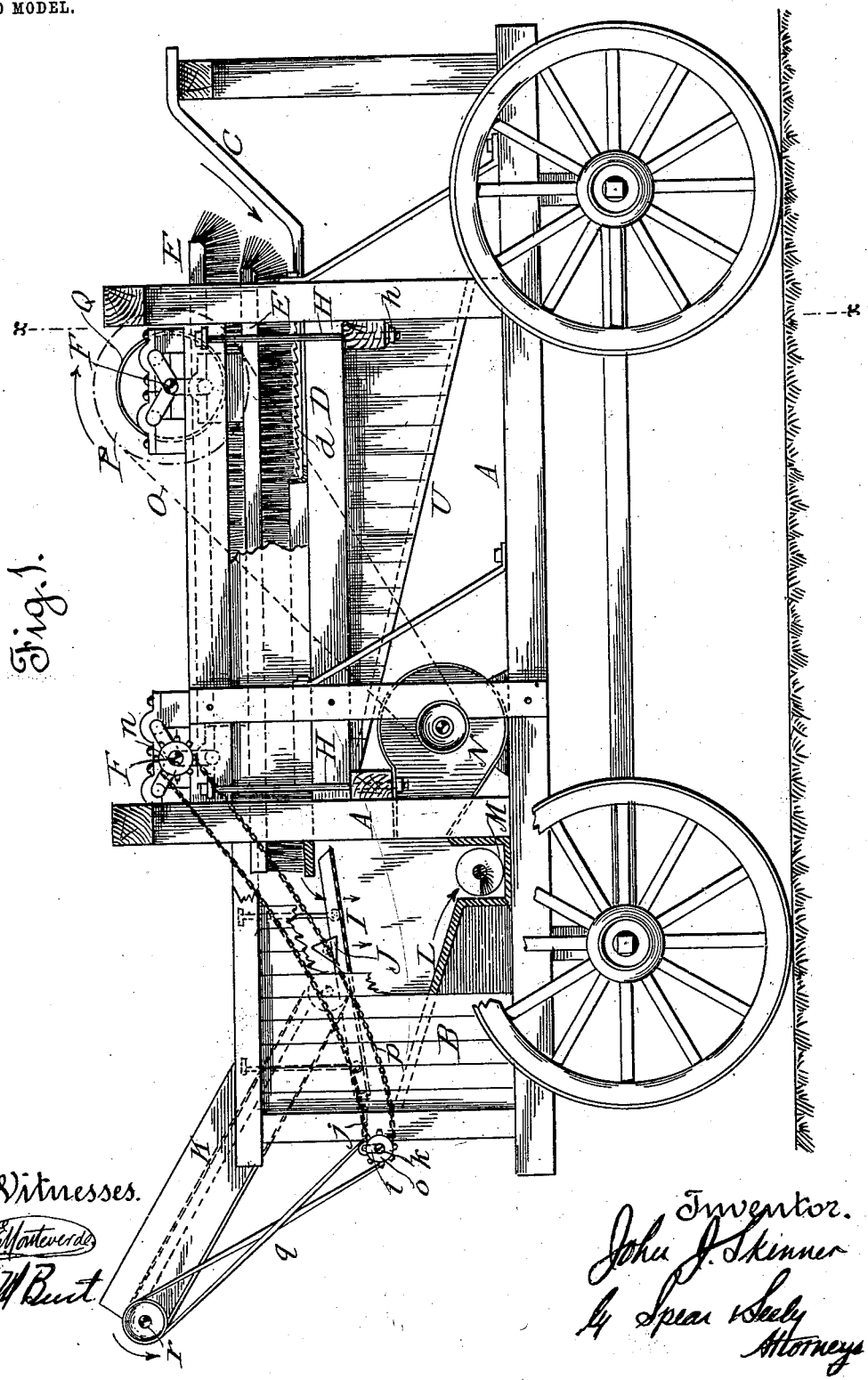

No. 722,919. PATENTED MAR. 17, 1903.
J. J. SKINNER.
THRESHER.
APPLICATION FILED OCT. 17, 1901.
NO MODEL. 2 SHEETS—SHEET 1.

Witnesses. Inventor.
John J. Skinner
by Spear Seely
Attorneys

No. 722,919. PATENTED MAR. 17, 1903.
J. J. SKINNER.
THRESHER.
APPLICATION FILED OCT. 17, 1901.
NO MODEL. 2 SHEETS—SHEET 2.
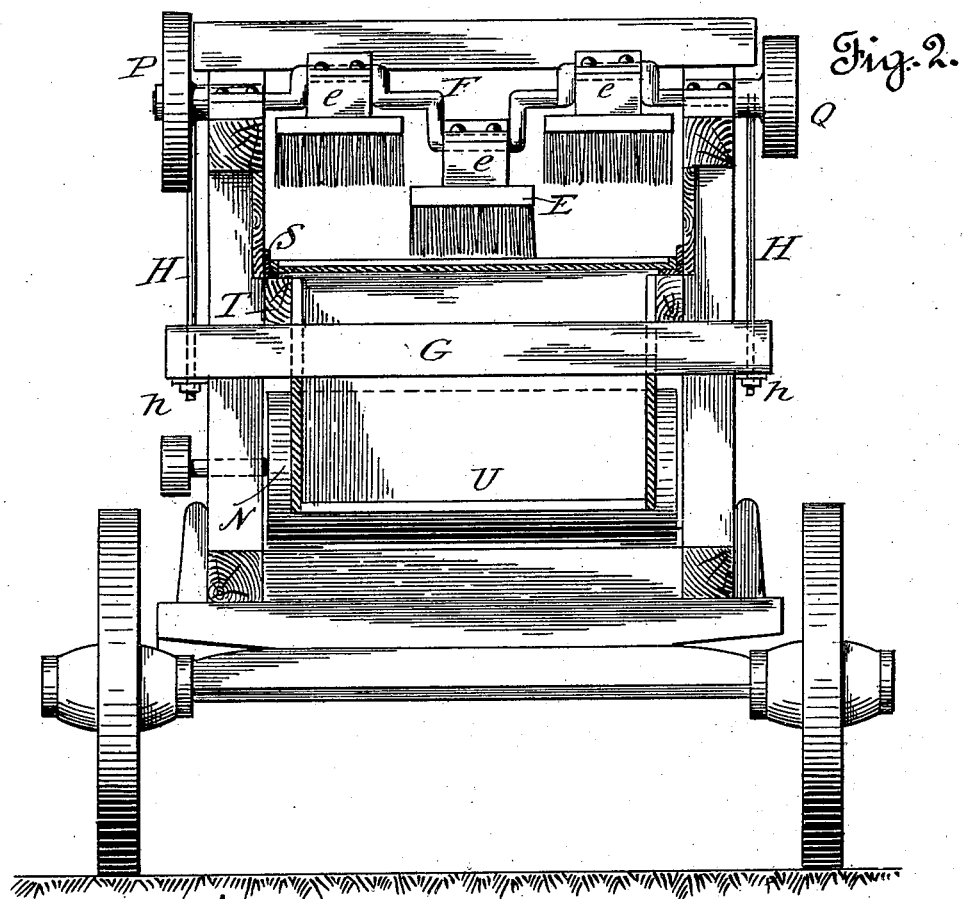
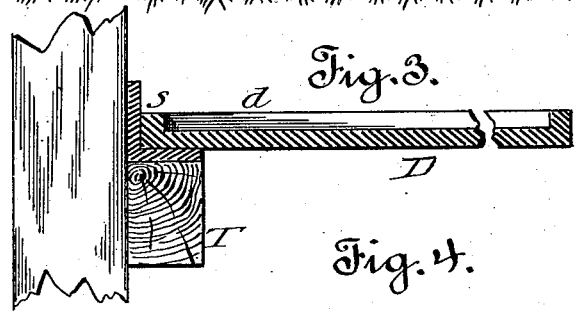
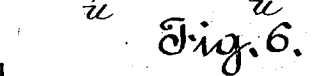
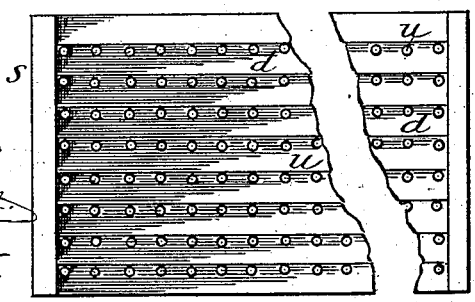

UNITED STATES PATENT OFFICE.

JOHN J. SKINNER, OF PASO ROBLES, CALIFORNIA, ASSIGNOR TO STOCKTON MANUFACTURING COMPANY.

THRESHER.

SPECIFICATION forming part of Letters Patent No. 722,919, dated March 17, 1903.

Application filed October 17, 1901. Serial No. 79,019. (No model.)

*To all whom it may concern:*

Be it known that I, JOHN J. SKINNER, a citizen of the United States, residing at Paso Robles, in the county of San Luis Obispo and State of California, have invented certain new and useful Improvements in Threshers, of which the following is a specification.

My invention relates to threshing-machines; and my object is to furnish a simple and powerful device which can be cheaply manufactured and in which a combination of very few operative parts produces singularly effective results, delivering the straw in better shape than ordinarily and without cracking or injuring the grain.

A machine embodying my invention comprises as the main separating device movable brushes, the tension or stiffness of which can be varied, operating in combination with a bed, table, or "concave" having superficial corrugations. The grain is compelled to pass between these brushes and the said bed exposed to a rubbing action, which separates the berries from the straw. Other devices, consisting of fan and screen, act subsequently to the main threshing mechanism and complete the separation. The peculiar construction and arrangement of brushes, concave and other parts of the complete machine are fully hereinafter described and are shown in the accompanying drawings, in which—

Figure 1 is a side elevation. Fig. 2 is a cross-section on line $x$ $x$ of Fig. 1. Fig. 3 is a detail cross-section of the bed or concave. Fig. 4 is a plan of a modified form of the same. Fig. 5 is a longitudinal section of the concave. Fig. 6 is a longitudinal section of the modification of Fig. 4.

The operative parts of the thresher are supported by a frame A, at the rear end of which is the casing B, in which the final separation of grain and straw is accomplished by means hereinafter described. At the upper forward end of the frame is the feed, comprising a chute or hopper C, down which an attendant feeds the grain into the machine. From the frame is supported the bed D, which extends for substantially the entire length and width of the machine and is provided with transverse acute angular ribs or teeth $d$, the incline of such teeth being toward the rear and its straight substantially vertical face toward the front or feeding end. With this ribbed bed-plate coöperate a series of peculiarly constructed and arranged brushes, the grain being carried through the machine between the bed and said brushes. Each brush comprises a long narrow rectangular head or stock E, supplied with flexible bristles made of any suitable material, such as wire or wood-fiber. I have found ratan well adapted for the purpose. The front end of the brush-stock is formed on a curve, which gives a curvature to the brush at the feed end, facilitating the entrance of the grain beneath it. Any number of these brushes can be used, according to the width of the machine. In the drawings three are shown, and that is the number I prefer to use. The brush-heads are provided with boxes $e$, which are suspended from crank-shafts F F, journaled in the frame near the respective ends of the latter. Each shaft has three cranks, set at thirds of the circumference. The cranks in the same longitudinal line are similarly disposed and are connected to one brush. In its lowest position any brush rests on the corrugated bed, and I provide an adjustment for the bed by which, first, the tension of the brush-bristles can be regulated by varying its relation to the bed, and, secondly, the proper relations between brushes and bed can be secured after the brushes have become worn. This adjustment is secured by suspending the cross-timbers G G, which support the bed, on threaded bolts H, provided with nuts $h$. Thus the whole bed can be adjusted up or down on the bolts and held at any adjustment relatively to the brushes. The two crank-shafts are given a rotary motion in the direction of the arrows in any suitable manner. Each brush thereby derives a longitudinal swinging movement from two centers, being raised from the corrugated bed and swinging up and forward and then down and backward in contact with the bed, the movements of the series of brushes being successive as the cranks follow around. The rubbing action between the brushes and bed separates the grain from the straw and causes both to move back toward the rear of the machine. Within the casing at the rear end is a screen I, upon which the grain is discharged by the brushes, while the straw is taken up by the picker J and transferred to the endless apron or straw-carrier K. The screen is suspended by hangers from the frame of the machine and is shaken by a crank $i$ and connecting-rod $j$, driven from the shaft $k$. Beneath the screen I is an oppositely-inclined grain-board L, leading to the discharge passage or spout M. An air-blast is directed upwardly through the sieve by a fan N, which drives off the chaff and insures a supply of clean grain to the discharge-spout.

The several moving parts of the machine can be driven in any suitable way, as by belts or sprocket-chains, as preferred.

In the drawings I have shown a belt O from a pulley P on one crank-shaft to gear up the fan-shaft to the requisite rapid rotation. From the other crank-shaft power is shown as applied to the straw-carrier by the sprockets $n$ and $o$, chain $p$, and a twisted belt $q$ to the roller-shaft $r$ of the carrier.

It is not necessary to connect the two crank-shafts by a belt, because when power is applied to one of them the other will be driven, deriving its motion through the brushes acting as connecting-rods. By having the cranks set on thirds, one set of cranks at least will always be driving. Q indicates a pulley on the forward crank-shaft, which can serve as a power-pulley and derive rotation from any suitable source, such as an engine. The pulley P also acts as a balance-wheel and keeps the motion of the crank-shafts steady and uniform and without jar or shake.

Figs. 3, 4, 5, and 6 relate to the construction of the toothed bed. This is preferably made in metallic sections, so that several are required in the length of the machine, each section being of the full width of the machine. These sections are supported by angle-rails S, which rest upon the longitudinal beams T. The sections of the bed are provided with strengthening-ribs $s$ at the sides, which are flush with the upper edges of the teeth, as shown in the figures last referred to. Figs. 3 and 5 represent the bed as originally used in threshing grain; but in Figs. 4 and 6 I have illustrated a modification which may also be used in the threshing of grain, but which I have designed with more special reference to the threshing of beans, which are frequently mixed with dirt. In this construction the bed is numerously perforated, the perforations $u$ extending through it from the bottoms of the curves between the teeth. The dirt and any foreign matter which can pass these perforations may fall upon the ground or upon any suitable receptacle, such as the chute U, through which it is discharged. In using this perforated bed in threshing grain it is the intention that all or part of the grain should pass through these perforations, and in this case I provide a traveling belt or carrier immediately below the bed in order to convey the grain to the shaking-screen for final cleaning. The construction of such a belt and its operation are obvious, and I have not considered it necessary to illustrate it in the drawings.

I do not limit myself to exact details of construction and arrangement herein described, and shown in the drawings, as I desire to avail myself of such modifications and equivalents as fall properly within the spirit of my invention.

Having thus fully described my invention, what I claim as new, and desire to secure by Letters Patent, is—

1. In a thresher, a flat bed in combination with a brush, cranks above the bed, in which said brush is mounted at both ends and substantially parallel with the bed, and means for operating the cranks whereby the whole brush-surface strikes the material on the bed, moves along the bed, and leaves the bed, substantially as set forth.

2. In a thresher, a flat bed in combination with a brush, cranks above the bed, in which said brush is mounted at both ends, and substantially parallel with the bed, means for operating the cranks whereby the whole brush-surface strikes the material on the bed, moves along the bed, and leaves the bed, and means for adjusting the bed relatively to said brush, substantially as set forth.

3. In a thresher, a flat corrugated and perforated bed, in combination with brushes above said bed, cranks from which said brushes are suspended at both ends, and means for operating said cranks, whereby the entire surfaces of said brushes are moved bodily into contact with material upon the bed, and along said bed, and away from said bed, substantially as set forth.

4. In a thresher, a relatively stationary bed, having a transversely-corrugated surface, a series of brushes whose combined area is approximately equal to that of said bed, a pair of crank-shafts each having a plurality of cranks, set at different angles, from which said brushes are suspended at both ends, and means for operating said crank-shafts, whereby the brush-surfaces are bodily, individually and successively caused to strike material on said bed, and to move along said bed, and then away from said bed, substantially as set forth.

In testimony whereof I have affixed my signature, in presence of two witnesses, this 21st day of September, 1901.

JOHN J. SKINNER.

Witnesses:
A. PFISTER,
R. W. MARTINOFF.